USO12210944B2

(12) United States Patent
Frankel et al.

(10) Patent No.: US 12,210,944 B2
(45) Date of Patent: Jan. 28, 2025

(54) NETWORK SYSTEM MODELING USING NESTED MODELS COMBINING MACHINE LEARNING AND BEHAVIORAL APPROACHES

(71) Applicant: Ciena Corporation, Hanover, MD (US)

(72) Inventors: Michael Y. Frankel, Bethesda, MD (US); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 1019 days.

(21) Appl. No.: 17/176,382

(22) Filed: Feb. 16, 2021

(65) Prior Publication Data

US 2022/0261686 A1    Aug. 18, 2022

(51) Int. Cl.
*G06N 20/00* (2019.01)
*H04B 10/079* (2013.01)

(52) U.S. Cl.
CPC ....... *G06N 20/00* (2019.01); *H04B 10/07953* (2013.01); *H04B 10/0797* (2013.01); *H04B 10/0799* (2013.01)

(58) Field of Classification Search
None
See application file for complete search history.

(56) References Cited

U.S. PATENT DOCUMENTS

| | | | |
|---|---|---|---|
| 7,184,410 B1 | 2/2007 | Frankel et al. | |
| 7,343,101 B1 | 3/2008 | Frankel et al. | |
| 7,369,300 B2 | 5/2008 | Sridhar et al. | |
| 7,415,208 B1 | 8/2008 | Taggans et al. | |
| 7,634,194 B2 | 12/2009 | Frankel et al. | |
| 8,045,855 B2 | 10/2011 | Frankel | |
| 8,433,192 B2 | 4/2013 | Frankel et al. | |
| 8,798,455 B2 | 8/2014 | Frankel | |
| 8,818,206 B2 | 8/2014 | Frankel | |
| 8,977,125 B2 | 3/2015 | Grigoryan et al. | |
| 10,171,161 B1 | 1/2019 | Côté et al. | |
| 10,171,169 B2 | 1/2019 | Frankel et al. | |
| 10,404,365 B2 | 9/2019 | Frankel et al. | |
| 10,715,888 B2 | 7/2020 | Swinkels et al. | |
| 10,749,602 B2 | 8/2020 | Charlton et al. | |
| 10,841,181 B2 | 11/2020 | Côté et al. | |

(Continued)

OTHER PUBLICATIONS

Yu et al., Machine-learning-based EDFA gain estimation, Journal of Optical Communications and Networking, vol. 13, No. 4, Published Feb. 12, 2021 (Doc. ID 417584); Total Pages: 9 (Year: 2021).*

(Continued)

*Primary Examiner* — Alan Chen
(74) *Attorney, Agent, or Firm* — Baratta Law PLLC; Lawrence A. Baratta, Jr.

(57) ABSTRACT

Systems and methods include obtaining input data related to a networking system; modeling operation of the networking system via a composite model that includes a plurality of sub-models that collectively form the composite model, wherein at least one sub-model is a behavioral sub-model and at least one sub-model is a machine learning model, wherein various data in the input data is provided to corresponding sub-models, and wherein each sub-model is configured to model one or more components in the networking system; and providing output data based on the modeling.

20 Claims, 6 Drawing Sheets

(56) References Cited

U.S. PATENT DOCUMENTS

| | | |
|---|---|---|
| 11,394,799 B2 † | 7/2022 | Jackson |
| 2005/0094252 A1 | 5/2005 | Haggans et al. |
| 2006/0023754 A1 | 2/2006 | Sridhar et al. |
| 2006/0139742 A1 | 6/2006 | Frankel et al. |
| 2007/0025730 A1 | 2/2007 | Frankel |
| 2007/0166032 A1 | 7/2007 | Frankel |
| 2015/0095787 A1* | 4/2015 | Bhaskara ............ H04J 14/0241 715/735 |
| 2018/0248905 A1 | 8/2018 | Côté et al. |
| 2019/0303726 A1 | 3/2019 | Côté et al. |
| 2019/0138948 A1 | 5/2019 | Janulewicz et al. |
| 2019/0280942 A1 | 9/2019 | Côté et al. |
| 2020/0082013 A1 | 3/2020 | Triplet et al. |
| 2020/0162172 A1 | 5/2020 | Sridhar et al. |
| 2020/0259700 A1 | 8/2020 | Bhalla et al. |
| 2020/0259717 A1 | 8/2020 | Ong et al. |
| 2020/0287788 A1 | 9/2020 | Triplet et al. |

OTHER PUBLICATIONS

Zhu et al. Hybrid machine learning EDFA model, Optical Fiber Communication Conference. Optica Publishing Group, 2020; Total Pages: 3 (Year: 2020).*

Yvan Pointurier, Machine learning techniques for quality of transmission estimation in optical networks, Journal of Optical Communications and Networking, vol. 13, No. 4; Published Feb. 9, 2021; Total Pages: 12 (Year: 2021).*

\* cited by examiner
† cited by third party

NETWORK SYSTEM MODELING USING NESTED MODELS COMBINING MACHINE LEARNING AND BEHAVIORAL APPROACHES

FIELD OF THE DISCLOSURE

The present disclosure generally relates to networking and machine learning. More particularly, the present disclosure relates to systems and methods for network system modeling using nested models combining machine learning and behavioral approaches.

BACKGROUND OF THE DISCLOSURE

In networking, fiber-optic communication includes transmitting information from an optical transmitter over an optical fiber to a receiver. Additionally, there can be one or more optical amplifiers, e.g., Erbium-Doped Fiber Amplifiers (EDFAs), Raman amplifiers, etc. between the transmitter and receiver. As described herein, this can be referred to as an optical system. There is a need to accurately model the behavior of an optical system, i.e., power, dispersion, non-linear effects, Bit Error Rate (BER), and the like. An example of conventional optical system modeling is described in commonly-assigned U.S. Pat. No. 8,761,610, issued Jun. 24, 2014, and entitled "Methods and systems for the performance analysis of fiber optic networks," the contents of which are incorporated by reference in their entirety. As noted in U.S. Pat. No. 8,761,610, conventional approaches to optical signal propagation modeling can be grouped into two broad categories, namely fully numeric approaches and semi-analytic or empirical approaches. Even further, there are evolving Machine Learning (ML)-based approaches.

Fully numeric approaches solve electromagnetic wave propagation equations and generally account for non-linear effects in the propagation medium (i.e., fiber). The resources required for such approaches, including computer memory requirements and computational time, grow rapidly with increased system complexity. Second, the semi-analytic or empirical approaches typically divide signal propagation into separate components, each component associated with a particular propagation effect. Examples of such propagation effects are Amplified Spontaneous Emission (ASE) noise accumulation associated with optical amplifiers, Self-Phase Modulation (SPM) associated with single-channel fiber nonlinearity, Cross-Phase Modulation (XPM) associated with a fiber nonlinearity coupling multiple adjacent channels, and the like. Each effect can be assumed to be independent of the others if each contributes only a small overall distortion to the signal. Calculations are typically carried out on a complete end-to-end link, starting at the point where an optical signal is generated and ending at the electrical receiver. In general, the semi-analytic or empirical approaches to optical signal propagation modeling provide computational efficiency but sacrifice accuracy. One area of deficiency associated with these approaches involves their application to richly interconnected optical networks. A small change in one area of a network can impact optically coupled signals spanning a large geographic area and thus require extensive re-computation.

An alternative Machine-Learning approach can be used to model the complete optical system. For example, this approach can input vast amounts of system-level information to predict overall transmission link behavior as a single entity. Similarly, other systems (besides optical) also discuss ML-based techniques for modeling the overall system as a single entity, relying on machine learning algorithms to auto-select features of importance without domain-level expertise. Most ML/Artificial Intelligence (AI) applications are used to learn and automate relationship identification between a collection of inputs and some valuable outputs. The outputs can be a set of metrics, some actions to be taken, a set of predictions, etc. depending on the nature of the problem and the algorithm (supervised/unsupervised/reinforcement learning). However, the approach of modeling an optical system as a single entity has disadvantages in terms of complexity, data collection, computation, model training, and the like.

BRIEF SUMMARY OF THE DISCLOSURE

The present disclosure relates to systems and methods for network system modeling using nested models combining machine learning and behavioral approaches. Generally, the present disclosure includes a decomposition of one large system model into a subset of smaller, nested models and uses a combination of subsystem behavioral (domain-based) models and ML algorithms. This approach can be used in optical system modeling as well as other network applications. This approach includes much better isolation of cause and effect, improved accuracy (precision and recall), significantly reduced computational, flexibility, and the like.

In various embodiments, the present disclosure includes a method with steps, a processing device configured to implement the steps, and a non-transitory computer-readable medium having instructions that, when executed, cause one or more processors to perform the steps. The steps include obtaining input data related to a networking system; modeling operation of the networking system via a composite model that includes a plurality of sub-models that collectively form the composite model, wherein at least one sub-model is a behavioral sub-model and at least one sub-model is a machine learning model, wherein various data in the input data is provided to corresponding sub-models, and wherein each sub-model is configured to model one or more components in the networking system; and providing output data based on the modeling.

At least one sub-model can model performance of one or more components in the networking system, and at least one sub-model models conditions or rules associated with operation of the networking system. At least one sub-model can be nested within another sub-model. A set of sub-models can be a modular set that is repeated a plurality of times in the composite model. The networking system can be an optical system and the plurality of sub-models include a transmitter sub-model, a span sub-model, and a receiver sub-model. There can be one transmitter sub-model and a corresponding receiver sub-model for each optical channel in the optical system, and there can be a span sub-model for each fiber span in the optical system. The plurality of sub-models can include a transmitter model that includes a nested modulator sub-model, a span sub-model that includes one or more of a nested span fiber sub-model and an amplifier sub-model, and a receiver sub-model. The input data can include any of pump currents, optical amplifier gain, optical power values at various locations in the optical system, and fiber length, and wherein the output data includes any of pre-Forward Error Correction (FEC) Bit Error Rate (BER), Optical Signal-to-Noise Ratio (OSNR), and received power.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for network system modeling using nested models combining machine learning and behavioral approaches. Generally, the present disclosure includes a decomposition of one large system model into a subset of smaller, nested models and uses a combination of subsystem behavioral (domain-based) models and ML algorithms. This approach can be used in optical system modeling as well as other applications. This approach includes much better isolation of cause and effect, improved accuracy (precision and recall), significantly reduced computational, flexibility, and the like.

Neural Network

Figure 1:
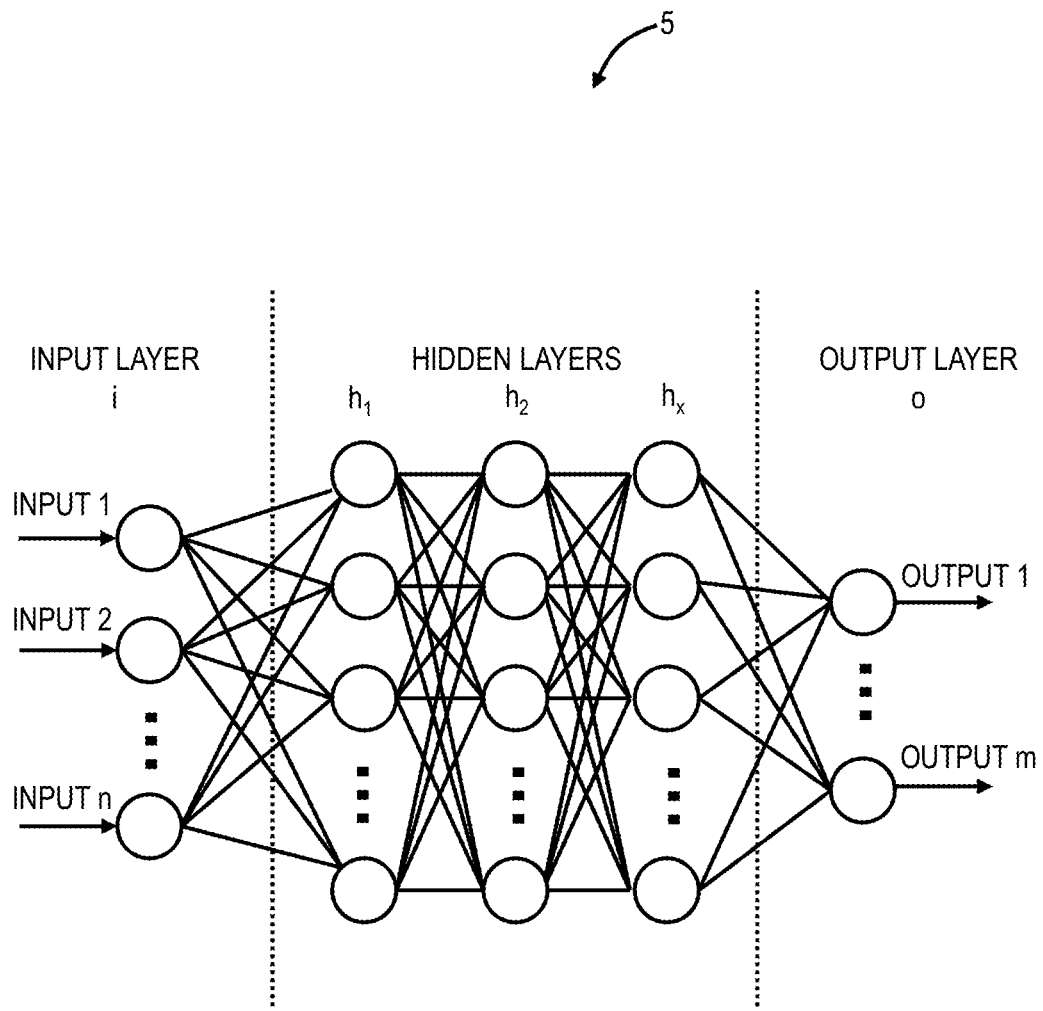
FIG. 1 is a diagram of a neural network.

FIG. 1 is a diagram of a neural network 5. Current supervised ML/AI approaches collect vast amounts of data, apply labels to the data, and train ML/AI techniques on whatever set of valuable outputs is desired. The neural network 5 can include an input layer, i, that receives up to n inputs, hidden layers $h_1, h_2, \ldots h_x$, and an output layer, o, with m outputs.

There are several issues that can be identified with the above approach. The complexity of the neural network 5 that is trained using state-of-the-art backpropagation scales approximately $O(n^5)$, assuming for simplicity that n is the number of inputs, and a fully connected net requiring n gradient iterations, i.e., there are O(n) elements in each hidden layer. There is a requirement for a vast amount of data collection in a centralized location that may overload system messaging bandwidth. The amount of collected input data may overwhelm the computational algorithm, i.e., the needle in a haystack problem, thereby requiring specialized infrastructure to deal with large amounts of data, usually distributed in a computing cluster. Many ML techniques are inherently sequential and cannot be easily distributed/parallelized without impacting convergence or accuracy.

In addition to the increased computational complexity, larger models are inherently more difficult to deploy. As an example, the largest public Deep Neural Network (DNN) model GPT-3 (developed by OpenAI, used for natural language processing) corresponds to ~350 GB of data. The massive size alone of such a model makes deployment challenging, severely limiting how frequently such a model can be updated, and it requires large servers, even for inferences. The relationship between the collected data to the output metrics may not be straightforward. Although ML is conceptually designed to deal with this problem, this may result in an overly complicated algorithm. DNNs, in particular, can model complex relationships but require a lot of data to be properly trained—which may be computationally prohibitive as seen above, and are typically considered a black box because of their complexity, i.e., humans typically cannot comprehend the reasoning or why a particular prediction is made. In addition, more complex ML models do not generalize as well as simpler models. The relationship between cause and effect may be weak or strong, depending on system configuration. This approach may also hide the underlying fundamental cause for the specific output state, which makes it impossible to develop system functional understanding or validate correctness. Also, some output states may be caused by inputs that are completely missing from the training data. Further, some metrics may substantially hide underlying trends. For example, observing client signal errors after modem Forward Error Correction (FEC) hides gradual degradations (can be visible pre-FEC) and also exhibits binary fail when FEC stops working.

Again, the present disclosure contemplates a decomposed system model—one large system model decomposed into a (possibly nested) subset of smaller models, namely sub-models. The sub-models may represent the intrinsic behavior or performance of a network element, or extrinsic elements such as environmental conditions or business rules. This substantially reduces total computational complexity. For example, a single ML model with 50 inputs will have a computational complexity of $O(50^5) \sim O(312M)$. The same ML model decomposed into 3×17-input stages will have a complexity of $3*O(17^5) \sim O(4M)$. Also, the present disclosure augments ML approaches with behavioral (domain-based) models and machine learning (ML) techniques to address problems with computational complexity, root cause identification, modeling beyond ranges of observed experience, etc.

In addition to being easier to train, the nested sub-model approach is also more modular and flexible, allowing operators to only (re)train and redeploy a fraction of the overall model, if needed. Further, sub-model learning can be shared and transferred among identical or similar module models, which is not possible using a total-system model. This decomposition can be applied to a variety of problems, including but not limited to fiber-optic Wavelength Division Multiplexed (WDM) systems. However, for illustration purposes, the present disclosure is described with reference to a fiber-optic transmission system, as follows.

Optical Network

Figure 2:
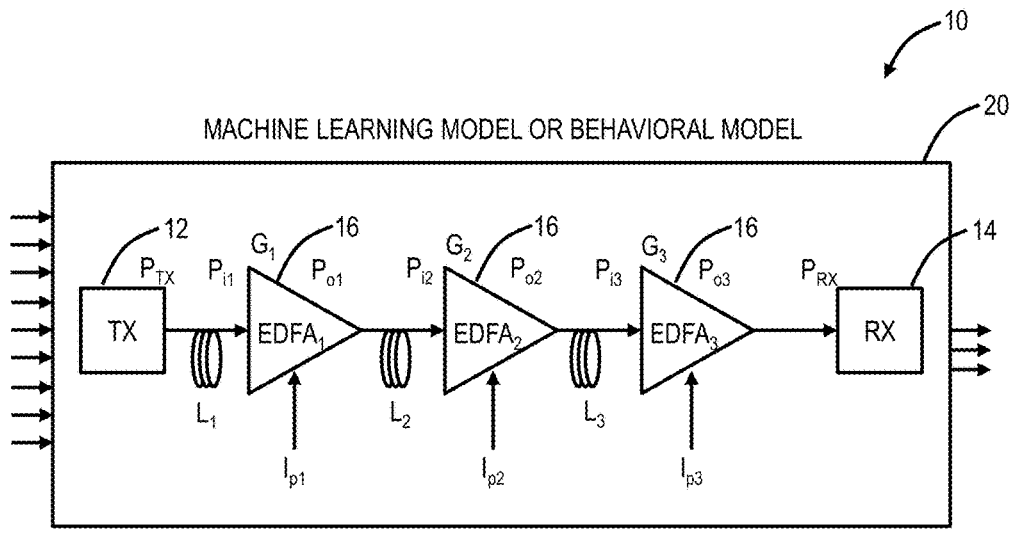
FIG. 2 is a network diagram of an example optical system.

FIG. 2 is a network diagram of an example optical system 10. This example optical system 10 illustrates a single, uni-directional link from a transmitter 12 to a receiver 14. The transmitter 12 and the receiver 14 can be a coherent optical modem utilizing various coherent modulation techniques and with polarization multiplexing. Also, this example includes three-spans with optical amplifiers 16. Of course, those skilled in the art will recognize that various other configurations are possible and contemplated here-with. Also, those skilled in the art recognize that a bi-directional optical link (e.g., Optical Multiplex Section (OMS)) can be modeled as two separate uni-directional optical links. In FIG. 2, the optical system 10 can be modeled via an optical system model 20 that can be an ML model or behavioral model. The inputs can include pump currents, $I_p$, input optical powers, $P_i$, output optical powers $P_o$, amplifier optical gain, G, transmitted optical power $P_{TX}$, fiber loss, L, etc. The parameter outputs can include pre-FEC BER, Optical Signal-to-Noise Ratio (OSNR), received power, $P_{RX}$, etc.

Figure 3:
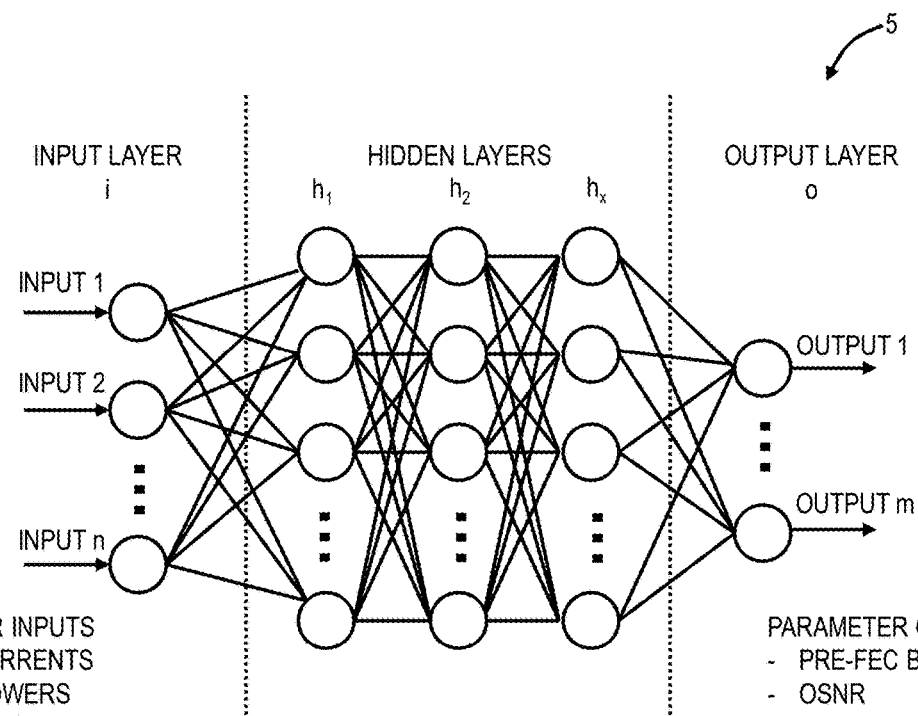
FIG. 3 is a diagram of the neural network as a single ML neural network model on top of the composite optical system.

FIG. 3 is a diagram of the neural network 5 as a single ML neural network (or GNpy) model on top of the composite optical system 10. Here, there is a single neural network 5 that is the optical system model 20 and accepts the inputs, i.e., the pump currents, $I_p$, input optical powers, $P_i$, output optical powers $P_o$, amplifier optical gain, G, transmitted optical power $P_{TX}$, received optical power, $P_{RX}$, etc., processes this data through the input layer, the hidden layers, and the output layer, and provides the outputs, i.e., pre-FEC BER, etc. With this neural network 5, it is possible to determine the proper settings for the inputs to achieve the desired output, e.g., what power and gain settings are needed for a given pre-FEC BER. Again, the neural network 5 in FIG. 3 suffers from the disadvantages described above with reference to FIG. 1.

Those skilled in the art recognize that the optical system 10 is implemented by physical hardware, i.e., network elements. The network elements include modules, cards, etc. Examples include coherent optical modems, optical amplifiers, Wavelength Selective Switches (WSSs), multiplexers/de-multiplexers, Variable Optical Attenuators (VOAs), etc. These devices are configured with the inputs, i.e., pump currents, $I_p$, input optical powers, $P_i$, output optical powers $P_o$, amplifier optical gain, G, transmitted optical power $P_{TX}$, received optical power, $P_{RX}$, fiber loss, L, etc. The network elements and associated components can be interfaced via a Network Management System (NMS), Element Management System (EMS), Software Defined Networking (SDN) controller, orchestration system, Craft Interface (CI), and the like. Further, there can be Northbound Interfaces (NBI), Application Programming Interfaces (APIs), and the like for data exchange and configuration.

Composite System Model for an Optical Network

Figure 4:
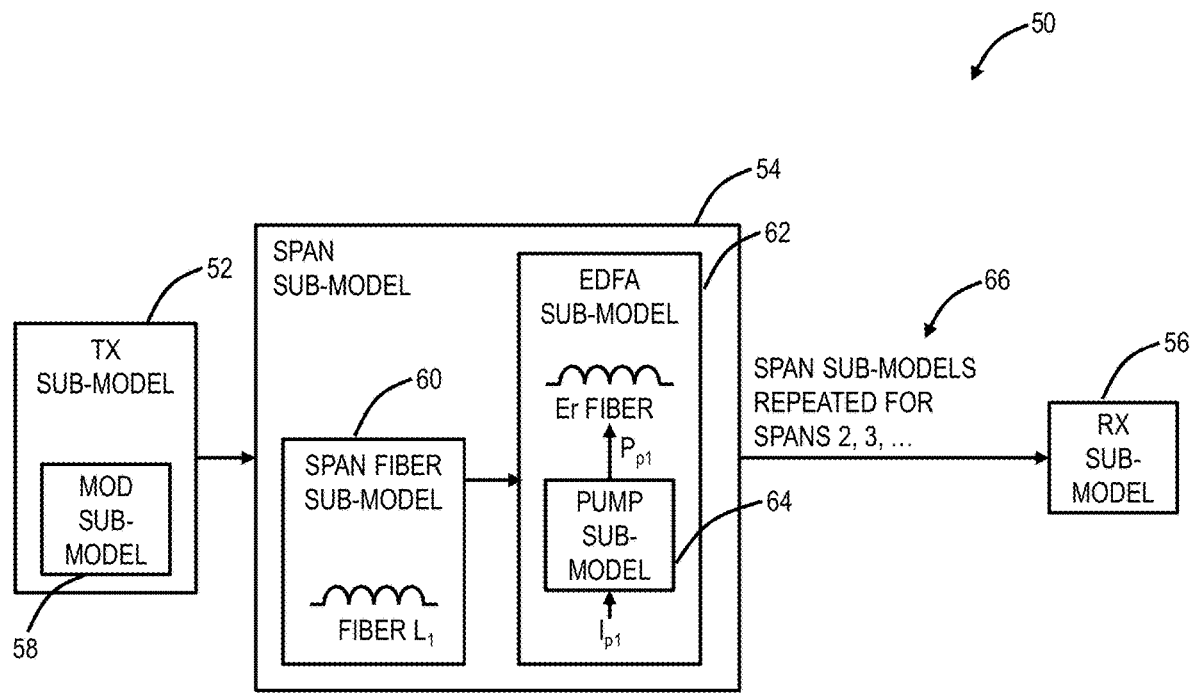
FIG. 4 is a diagram of a decomposition of the optical system model in a composite system model that is represented as a recursive collection of nested and modular sub-models.

FIG. 4 is a diagram of a decomposition of the optical system model 20 in a composite system model 50 that is represented as a recursive collection of nested and modular sub-models 52-64. Again, the key differentiation of this approach is extending ML-based modeling with the concept of sub-model hierarchical construction, possibly augmented and combined with behavioral-based sub-models. The optical system model 20 here is decomposed in the composite system model 50, instead of a single neural network 5. With the optical system 10, the composite system model 50 includes a transmitter (TX) sub-model 52, a span sub-model 54, and a receiver (RX) sub-model 56. From a recursive perspective, the TX sub-model 52 includes an optical modulator sub-model 58, and the span sub-model 54 includes a span fiber sub-model 60 and an EDFA sub-model 62, which also includes a pump sub-model 64. From a modular perspective, the span sub-model 54 can be repeated for each span 66. Also, from a modular perspective, the TX sub-model 52 and the RX sub-model 56 can be repeated for each optical channel.

The following descriptions provide additional details of the sub-models 52-64.

Pump Sub-Model

Figure 5:
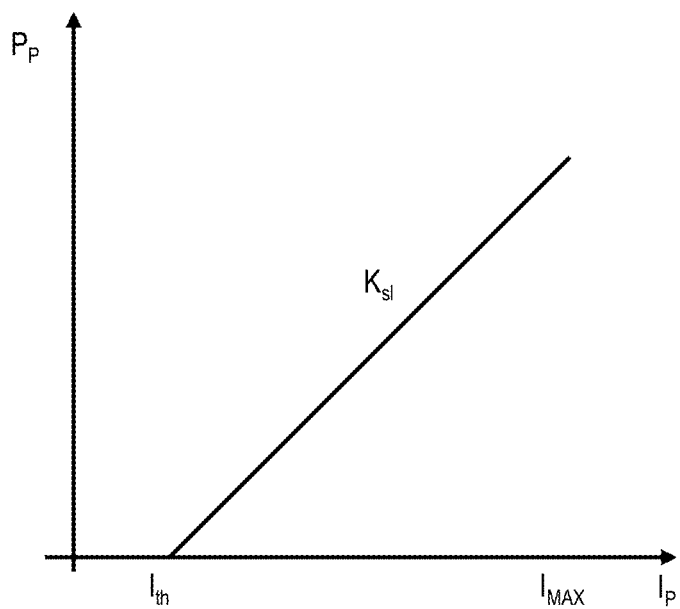
FIG. 5 is a graph for the pump sub-model illustrating the optical slope efficiency $K_{sl}$ as a function of diode output optical pump power $P_p$ and drive current input $I_p$.

The pump sub-model 64 models an optical pump diode (or multiple pumps) used inside the EDFA. An optical amplifier such as an EDFA operates by pumping doped fiber with an optical pump. The optical pump diode includes drive current input Ip and diode output optical pump power $P_p$. There are three parameters that can describe its behavior: threshold current $I_{th}$, optical slope efficiency $K_{sl}$, and maximum allowed drive current $I_{max}$. Output power is given as $P_p = K_{sl}*(I_p - I_{th})$ up to a maximum determined by $I_{max}$. FIG. 5 is a graph for the pump sub-model 64 illustrating the optical slope efficiency $K_{sl}$ as a function of diode output optical pump power $P_p$ and drive current input $I_p$. The parameters $I_{th}$ and $K_{sl}$ may come from manufacturing data, such as stored on a memory device in the EDFA or may be learned via ML techniques during system turn-up and operation. Further, $K_{sl}$ may be computed from measured operating parameters $P_p$ and $I_p$, and its evolution over time may indicate component aging.

EDFA Sub-Model

Figure 6:
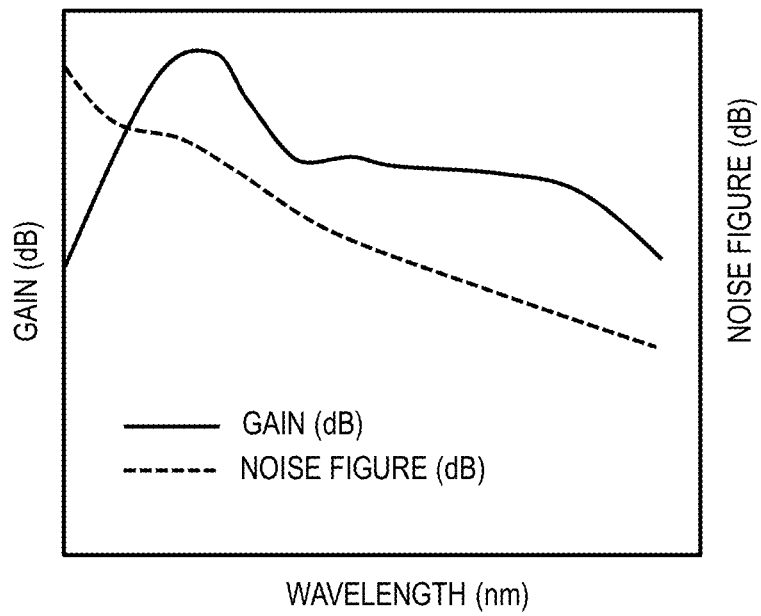
FIG. 6 is a graph of an EDFA sub-model illustrating gain (dB) and Noise Figure (NF) versus wavelength assuming negligible input signal power $P_i$.

The EDFA can be modeled using a well-developed semi-numerical, empirically based approach. For example, assume a 10 m length erbium-doped fiber (e.g., FiberCore I4) that is modestly doped and using a 120 mW 980 nm pump. FIG. 6 is a graph of an EDFA sub-model illustrating gain (dB) and Noise Figure (NF) versus wavelength for a 120 mW pump assuming negligible input signal power $P_i$. Of note, the small-signal Gain and Noise Figure profile can be computed at any pump power, and a semi-numerical model can be further extended to a large-signal regime and to a multi-channel WDM regime. But it is also possible to use a much-simplified approach that may be sufficient for most use cases of interest, which models output power $P_o$ under large input signal loading $P_i$ simply as $P_o = P_i + \eta * P_p$, where $\eta$ is EDFA efficiency.

Noise Figure may be assumed to be independent of the input power $P_i$ under a simple approximation, and EDFA gain is computed as $$G = \frac{P_o}{P_i}, \text{in linear units}$$

This approach is described in commonly-assigned U.S. patent application Ser. No. 16/746,117, filed Jan. 17, 2020, and entitled "System-level optical amplifier efficiency performance metric," the contents of which are incorporated by reference in their entirety. Efficiency $\eta$ indicates the health of the EDFA module, with a hard pass/fail characteristic when efficiency drops below a value based on a specific EDFA model and may indicate aging degradations in couplers and isolators, increasing splice loss, etc.

Efficiency parameters $\eta$ may come from manufacturing data or may be learned via ML techniques during system turn-up and operation and may be computed from measured operating parameters $P_i$, $P_o$ and $P_p$. Again, its evolution over time may indicate component aging.

Figure 7:
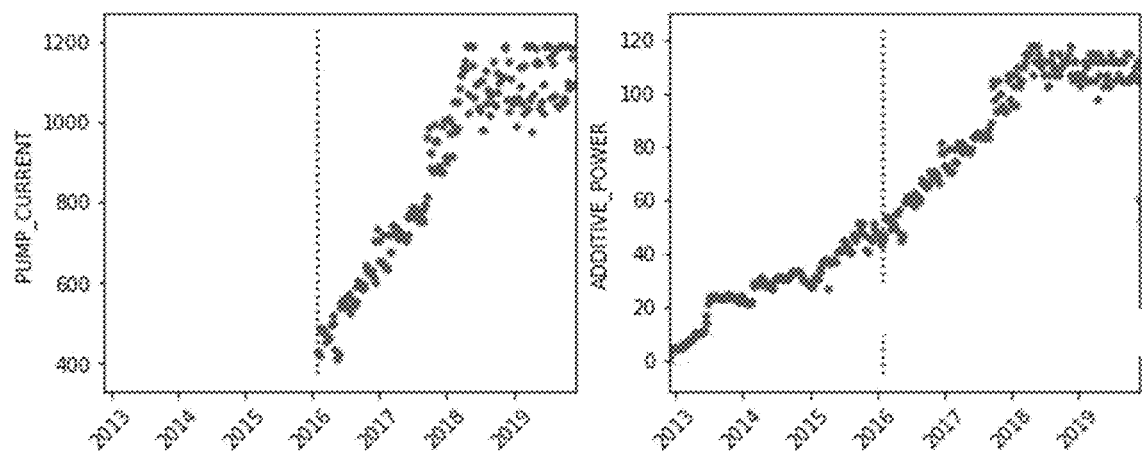
FIG. 7 is two graphs illustrating EDFA pump current and output power response due to channel loading growth over time.

However, where ML techniques may fail is when the operation is pushed beyond the learning range, and this is where behavioral modeling becomes very helpful or even mandatory. For example, EDFA may be deployed in a lightly-loaded WDM system and provides sufficient gain to compensate for the loss. As more WDM signals are added due to traffic growth, control loops increase pump current $I_p$ and corresponding pump power $P_p$, keeping the EDFA optical gain constant. But at some level of loading, $I_p$ may hit its $I_{max}$ value thereby clamping $P_p$. This will produce a drop in gain as well as a drop in overall system performance, which could not have been anticipated with a pure Machine Learning model. FIG. 7 is two graphs illustrating EDFA pump current and output power response due to optical channel loading growth over time. Channel performance degrades (EDFA additive power clamped) due to the pump current $I_p$ hitting $I_{max}$ value around year 2018.

Fiber Sub-Model

The fiber in the fiber sub-model can be modeled simply as loss L in a linear approximation. Of course, depending on the application requirements (accuracy, latency, computational complexity, etc.), the simple linear sub-model may be replaced or extended to include spectral effects or non-linear effects of the optical link. For applications that require even greater accuracy, the fiber sub-model may be further extended by state-of-the-art DNN-based model that can accurately represent non-linear effects for each span of the link. This is described, for example, in commonly-assigned U.S. Pat. No. 10,236,982, issued Mar. 19, 2019, and entitled "Fiber parameter identification," the contents of which are incorporated by reference in their entirety.

Fiber loss may be learned via ML techniques and may show daily variations and seasonal variations, possibly induced by thermal effects. It may be best learned as a base loss with superposed learned offset fluctuations. In this case, a sudden jump in base loss (i.e., due to splice repair or bent fiber, etc.) will not necessitate a complete re-learning of offset periodic fluctuations.

TX and RX Sub-Models

The TX sub-model 52 can including modeling a transmitter simply as delivering channel power $P_{TX}$. The RX sub-model 56 can model the receiver as a mapping from received power $P_{RX}$ and received Optical Signal-to-Noise Ratio (OSNR) to pre-FEC BER. While the exact approach is not detailed herein, it can be as simple as a look-up table or as complex as a detailed analysis of RX noise sources, control loops, etc. RX mapping from $P_{RX}$ and OSNR to pre-FEC BER may also be implemented with an ML block since all three quantities are generally obtainable from a Digital Signal Processor (DSP)-based coherent receiver. ML training results may be shared among like modem models to enable a wider training range than may be obtainable locally at a single unit.

Modulator Sub-Model

Figure 8:
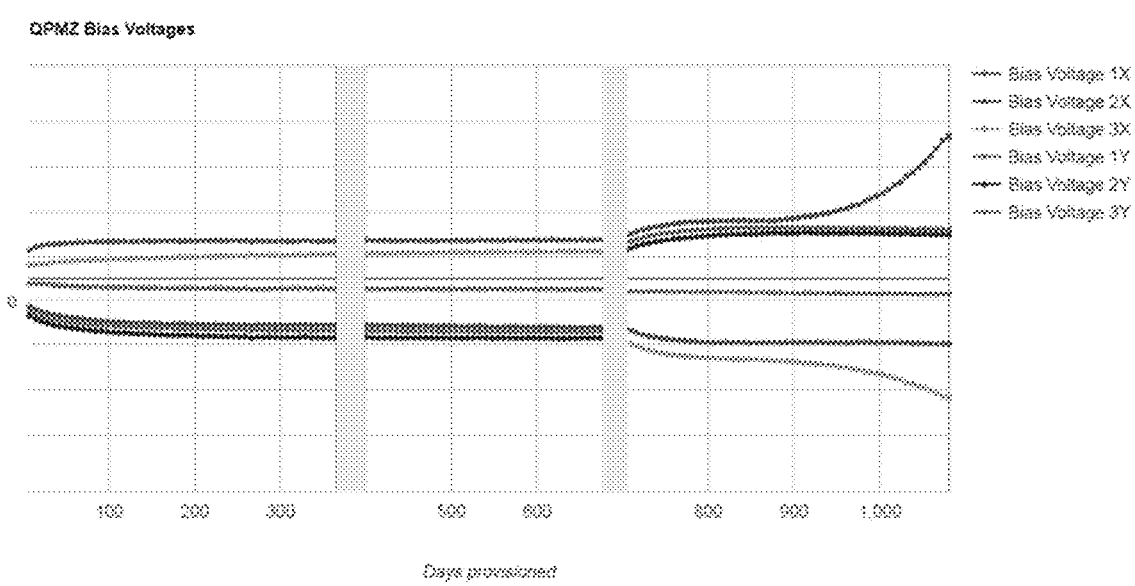
FIG. 8 is a graph illustrating example optical modulator bias voltage values over time.

The optical modulator sub-model 58 can be used for modulator bias control. A Modulator Bias Controller (MBC) circuit is configured to maintain a specific electrical bias point on a transfer function curve of a modulator that would otherwise drift over time and cause system performance issues. For example, six voltages may be used to control the bias of a TX modulator. All of these voltages may start around 0V. However, when the components gradually age, the modulators may normally have a voltage that changes non-linearly toward about +/−18V at the end of the component's life. FIG. 8 is a graph illustrating example bias voltage values over time.

In a simple case, the modulator sub-model 58 may include a thresholding function and report an issue if any bias voltage is greater/lower than +/−14V, for example. For improved accuracy, ML models may be trained to recognize voltage drifting patterns and distinguish between different types of failures, such as described in U.S. patent application Ser. No. 16/833,740, filed Mar. 30, 2020, and entitled "Predicting imminent failure of electronic components using supervised and unsupervised machine learning," the contents of which are incorporated by reference in their entirety, which facilitates the root-cause analysis by the composite parent model.

Composite Link Model

Referring back to FIG. 4, an example includes the computation of two output channel parameters, $P_{RX}$ and OSNR in order to compute received pre-FEC BER. Subsequently, Pre-FEC BER may be used to compute system margin, anticipate service outages, etc. That is, use the inputs to model $P_{RX}$ and OSNR as outputs, compute received pre-FEC BER based on the outputs, and compute system margin, anticipate service outages, etc. based on the received pre-FEC BER.

$P_{RX}$ is a multiplicative cascade of Gain (G) and Loss (L) elements in the link, computed as $$P_{RX} = P_{TX} \frac{G_1}{L_1} \frac{G_2}{L_2} \frac{G_3}{L_3},$$

all in linear units.

Amplified Spontaneous Emission (ASE) power integrated over 0.1 nm bandwidth (as per convention) is required to compute OSNR, with $P_{ASE}$ given as $$P_{ASE} = \left(F_1 G_1 \frac{G_2}{L_2} \frac{G_3}{L_3} + F_2 G_2 \frac{G_3}{L_3} + F_2 G_3\right) 12.5 \text{ GHz},$$

where F is EDFA noise figure in linear units and $P_{ASE}$ power density is integrated over 12.5 GHz.

$$OSNR = \frac{P_{RX}}{P_{ASE}},$$

in linear units and accounting for both signal and ASE polarizations.

Note that while $P_{RX}$ and OSNR equations appear simple, the quantities G and L are variable in time and may be learned via sub-models 60, 62. Further, G itself may be computed from a learned sub-model 64 of EDFA diode pump parameters $I_p$ and $P_p$, for example, including $I_p$ clamping effects. Therefore, $P_{RX}$ and OSNR may exhibit complex time-varying behavior, but one that can be both readily computed, readily predicted and behaviorally traced-back for root cause analysis in cases where full link issues or failures may be predicted or anticipated.

Further, underlying component issues may or may not lead to full link issues depending on the residual margin. Clamped gain on a low-margin link may cause a problem, but an identical behavior on a high-margin link is perfectly acceptable.

Similarly, other complex system elements may be represented by sub-models such as a Reconfigurable Optical Add/Drop Multiplexer (ROADM), with a further sub-model decomposition to include WSS modules, EDFA modules, combiner/splitter modules, etc. All of these can include element physical properties, as well as impacts of corresponding software control loops. That is, the sub-models 52-64 in FIG. 4 are non-limiting examples.

Other Networking Examples

The prior description illustrated an example embodiment related to optical networks. The approach described herein can also be applied to other types of networks, such as Optical Transport Network (OTN), Ethernet, Internet Protocol (IP), Multiprotocol Label Switching (MPLS), and the like. That is, while the prior description relates to optical (Layer 0), the present disclosure can also apply to Layers 1, 2, 3, and higher layers as well. That is, any networking layer—together or in combination.

The present disclosure includes decomposition and a combination of behavioral and machine learning modeling with application to networking equipment. The networking equipment can be divided following industry Layers, such that Layer 0 refers to physical equipment used for data transmission, Layer 1 refers to circuit switching (e.g., OTN), Layer 2 refers to packet switching (e.g., Ethernet), Layer 3 refers to packet routing (e.g., TCP/IP), and the like. The operation of these layers is hierarchical, such that changes and/or failures at a lower layer impact higher layers, but not directly the other way around.

Layers 2 and 3 are packet processing layers and include networking equipment such as Ethernet switches and IP Routers. These include a variety of protocols for discovering connectivity, computing tables with entries that specify how each packet is to be processed and sent based on its attributes and destination, and for locally buffering packets in cases of packet arrival rates that temporarily exceed forwarding rates. There are many internal quantities that can serve as inputs to behavioral and/or machine learning models, such as buffer memory occupancy, fraction of available free memory, packet processing latency, compliance of internal forwarding rules with external policies, packet statistics such as presence of microbursts or elephant flows, etc. Failure modes such as route flapping (rapid changes in forwarding tables), buffer overflows and packet drops, etc. can be flagged and related to the quality of service.

Layer 1 is a network circuit connection layer and allocates tunnels with specific bandwidth to different users and services. These Sub-Network Connections (SNCs) are changed upon request by the end user or when triggered by a network protection/restoration event. Internal quantities that may be monitored are allocated and free bandwidth, internal SNC bandwidth utilization, statistics of protection/restoration events, etc.

Layer 0 is the physical connection layer, with a detailed example of how it may be modeled provided herein. An additional example may be related to network failures associated with fiber cuts and equipment failure. These can be often related to geographic locations: fiber plant failure rate in India is ~15 cuts/1,000 km per month, while being an order of magnitude lower in North America. Interestingly, weather related damage can be correlated to predicted weather events as well as how susceptible a specific location is to such weather. While it may not be possible to predict fiber cuts, there may be some opportunities for machine learning of weather-related damage.

As mentioned above, failures at Layer 0 can be correlated to failures and triggered protection/restoration events at higher layers, such as Layer 1, 2 and 3. Similarly, changes at Layer 1 will lead to correlated changes at Layers 2 and 3.

Process

Figure 9:
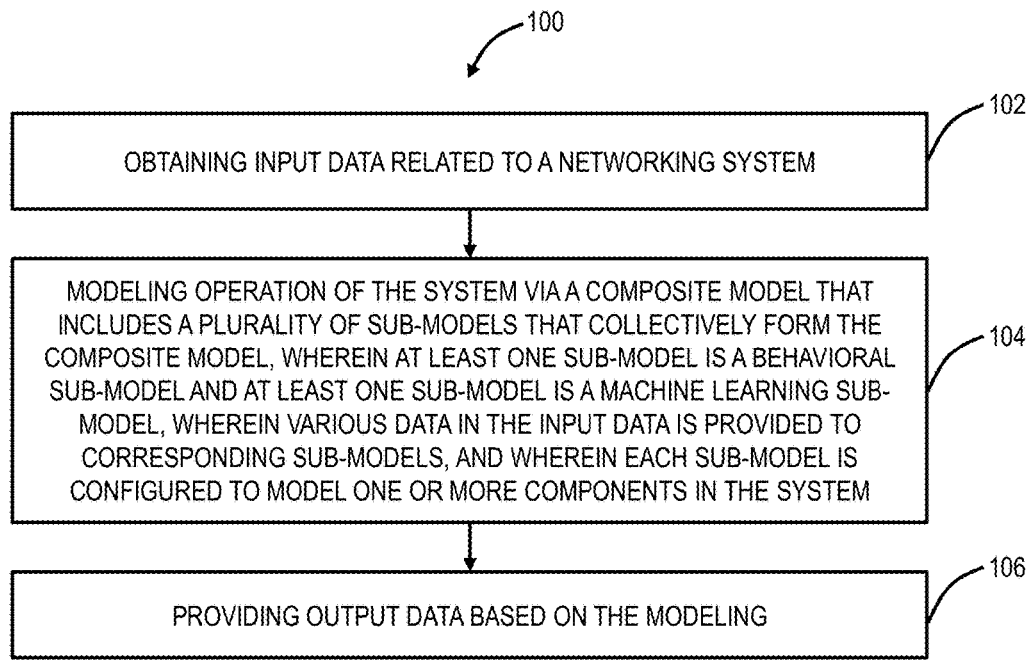
FIG. 9 is a flowchart of a process for optical system modeling using nested models combining machine learning and behavioral approaches.

FIG. 9 is a flowchart of a process 100 for optical system modeling using nested models combining machine learning and behavioral approaches. The process 100 can be implemented as a method that includes steps, via a processing device 200 configured to execute the steps, and via a non-transitory computer-readable medium that includes instructions that cause one or more processors to implement the steps.

The process 100 includes obtaining input data related to a system (step 102); modeling operation of the system via a composite model that includes a plurality of sub-models that collectively form the composite model, wherein at least one sub-model is a behavioral sub-model and at least one sub-model is a machine learning model, wherein various data in the input data is provided to corresponding sub-models, and wherein each sub-model is configured to model one or more components in the system (step 104); and providing output data based on the modeling (step 106).

Of note, the composite model is not an ensemble of different models, but rather a decomposition of a system into multiple sub-models. That is, each sub-model is configured to model one or more components in the system such that each sub-model covers different components, i.e., a decomposition. This decomposes a full, complex system into sub-elements. Again, a composition of smaller sub-models exhibits less complexity than one large single model.

At least one sub-model can model performance of one or more components in the system, and at least one sub-model can model conditions or rules associated with operation of the system. At least one sub-model can be nested within another sub-model. A set of sub-models can be a modular set that is repeated a plurality of times in the composite model.

The system can be an optical system and the plurality of sub-models include a transmitter sub-model, a span sub-model, and a receiver sub-model. There can be one transmitter sub-model and a corresponding receiver sub-model for each optical channel in the optical system, and wherein there is a span sub-model for each fiber span in the optical system. The plurality of sub-models can include a transmitter model that includes a nested modulator sub-model, a span sub-model that includes one or more of a nested span fiber sub-model and an amplifier sub-model, and a receiver sub-model. The input data can include pump currents, optical amplifier gain, optical power values at various locations in the optical system, and fiber length, and wherein the output data can include pre-Forward Error Correction (FEC) Bit Error Rate (BER), Optical Signal-to-Noise Ratio (OSNR), and received power.

Processing Device

Figure 10:
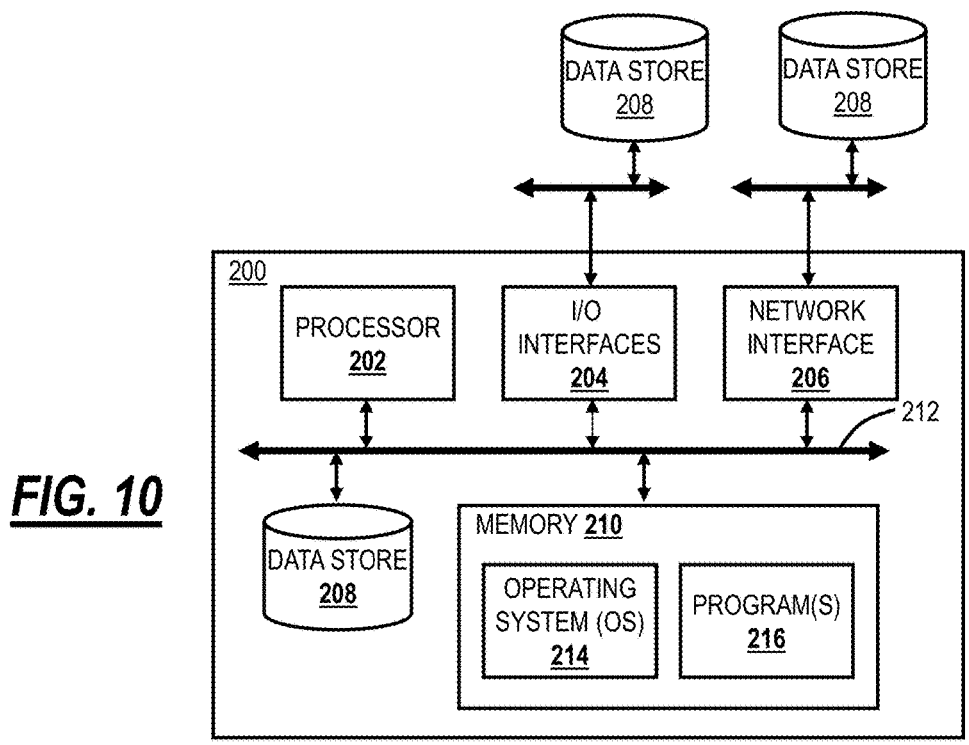
FIG. 10 is a block diagram of a processing device for use herein.

FIG. 10 is a block diagram of a processing device 200 for use herein. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 10 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium comprising instructions that, when executed, cause one or more processors to perform steps of:
   obtaining input data related to an optical networking system;
   modeling operation of the optical networking system via a composite model that includes a plurality of sub-models, wherein each of the plurality of sub-models is a decomposition of the optical networking system including one or more modular components comprising at least a transmitter sub-model, a span sub-model, and a receiver sub-model which collectively form the composite model, wherein at least one sub-model is a behavioral sub-model and at least one sub-model is a machine learning model, wherein various data in the input data is provided to corresponding sub-models, and wherein each sub-model is configured to model one or more components in the optical networking system; and
   providing output data based on the modeling.

2. The non-transitory computer-readable medium of claim 1, wherein at least one sub-model models intrinsic behavioral performance of one or more components in the networking system, and at least one sub-model models extrinsic conditions or rules associated with operation of the networking system.

3. The non-transitory computer-readable medium of claim 1, wherein at least one sub-model is-recursively nested within another sub-model, defining a sub-model hierarchical construction.

4. The non-transitory computer-readable medium of claim 1, wherein a set of sub-models is a modular set that is repeated a plurality of times in the composite model.

5. The non-transitory computer-readable medium of claim 1, wherein the plurality of sub-models further includes a span fiber sub-model, and a EDFA sub-model defining a pump sub-model.

6. The non-transitory computer-readable medium of claim 5, wherein there is one transmitter sub-model and a corresponding receiver sub-model for each optical channel in the optical system, and wherein there is a span sub-model for each fiber span in the optical system.

7. The non-transitory computer-readable medium of claim 5, wherein the plurality of sub-models include a transmitter model that includes a nested modulator sub-model, a span sub-model that includes one or more of a nested span fiber sub-model and an amplifier sub-model, and a receiver sub-model.

8. The non-transitory computer-readable medium of claim 5, wherein the input data includes any of pump currents, optical amplifier gain, optical power values at various locations in the optical system, and fiber length, and wherein the output data includes any of pre-Forward Error Correction (FEC) Bit Error Rate (BER), Optical Signal-to-Noise Ratio (OSNR), and received power.

9. A method comprising:
obtaining input data related to an optical networking system;
modeling operation of optical the networking system via a composite model that includes a plurality of sub-models, wherein each of the plurality of sub-models is a decomposition of the optical network system including one or more modular components comprising at least a transmitter sub-model, a span sub-model, and a receiver sub-model, wherein at least one sub-model is a behavioral sub-model and at least one sub-model is a machine learning model, wherein various data in the input data is provided to corresponding sub-models, and wherein each sub-model is configured to model one or more components in the optical networking system; and
providing output data based on the modeling.

10. The method of claim 9, wherein at least one sub-model models performance of one or more components in the networking system, and at least one sub-model models conditions or rules associated with operation of the networking system.

11. The method of claim 9, wherein at least one sub-model is nested within another sub-model.

12. The method of claim 9, wherein a set of sub-models is a modular set that is repeated a plurality of times in the composite model.

13. The method of claim 9, wherein the networking system is an optical system and the plurality of sub-models include a transmitter sub-model, a span sub-model, and a receiver sub-model.

14. The method of claim 13, wherein there is one transmitter sub-model and a corresponding receiver sub-model for each optical channel in the optical system, and wherein there is a span sub-model for each fiber span in the optical system.

15. The method of claim 13, wherein the plurality of sub-models include a transmitter model that includes a nested modulator sub-model, a span sub-model that includes one or more of a nested span fiber sub-model and an amplifier sub-model, and a receiver sub-model.

16. The method of claim 13, wherein the input data includes any of pump currents, optical amplifier gain, optical power values at various locations in the optical system, and fiber length, and wherein the output data includes any of pre-Forward Error Correction (FEC) Bit Error Rate (BER), Optical Signal-to-Noise Ratio (OSNR) and received power.

17. A processing device comprising:
one or more processors and memory comprising instructions that, when executed cause the one or more processors to
obtaining input data related to an optical networking system,
modeling operation of the networking system via a composite model that includes a plurality of sub-models, wherein each of the plurality of sub-models is a decomposition of the optical network system including one or more modular components comprising at least a transmitter sub-model, a span sub-model, and a receiver sub-model, wherein at least one sub-model is a behavioral sub-model and at least one sub-model is a machine learning model, wherein various data in the input data is provided to corresponding sub-models, and wherein each sub-model is configured to model one or more components in the optical networking system, and
providing output data based on the modeling.

18. The processing device of claim 17, wherein at least one sub-model models performance of one or more components in the networking system, and at least one sub-model models conditions or rules associated with operation of the networking system.

19. The processing device of claim 17, wherein at least one sub-model is nested within another sub-model.

20. The processing device of claim 17, wherein the networking system is an optical system and the plurality of sub-models include a transmitter sub-model, a span sub-model, and a receiver sub-model.

* * * * *